US007171529B2

(12) United States Patent
Ajiro

(10) Patent No.: US 7,171,529 B2
(45) Date of Patent: Jan. 30, 2007

(54) SINGLE-CHIP MICROCOMPUTER WITH READ CLOCK GENERATING CIRCUITS DISPOSED IN CLOSE PROXIMITY TO MEMORY MACROS

(75) Inventor: Kazuyoshi Ajiro, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 156 days.

(21) Appl. No.: 10/390,763

(22) Filed: Mar. 19, 2003

(65) Prior Publication Data
US 2003/0182528 A1 Sep. 25, 2003

(30) Foreign Application Priority Data
Mar. 20, 2002 (JP) ............... 2002-078418

(51) Int. Cl.
*G06F 13/00* (2006.01)
*G06F 12/00* (2006.01)
*G06F 12/06* (2006.01)
*G06F 1/06* (2006.01)

(52) U.S. Cl. ............... 711/157; 711/154; 711/104; 711/103; 711/102; 711/5; 713/500

(58) Field of Classification Search ............... 711/141, 711/5, 102, 103, 104, 173, 211; 709/221; 713/322, 500; 700/2; 710/3, 4
See application file for complete search history.

(56) References Cited

U.S. PATENT DOCUMENTS

| 4,387,424 | A | * | 6/1983 | Frediani et al. ............. 709/225 |
| 4,412,285 | A | * | 10/1983 | Neches et al. ............. 709/252 |
| 5,610,808 | A | * | 3/1997 | Squires et al. ............. 700/2 |
| 6,115,823 | A | * | 9/2000 | Velasco et al. ............. 713/322 |
| 6,625,748 | B1 | * | 9/2003 | Tanaka et al. ............. 714/6 |
| 2002/0007439 | A1 | * | 1/2002 | Gharachorloo et al. ..... 711/119 |
| 2002/0007443 | A1 | * | 1/2002 | Gharachorloo et al. ..... 711/141 |

* cited by examiner

*Primary Examiner*—Mano Padmanabhan
*Assistant Examiner*—Mardochee Chery
(74) *Attorney, Agent, or Firm*—Foley & Lardner LLP

(57) ABSTRACT

Flash ROMs operate at a speed slower than that of a CPU. In order to raise the operating speed of a single-chip microcomputer, therefore, interleaving is adopted and a plurality of flash ROMs are operated alternately to obtain an apparent operating speed equivalent to that of a CPU. Read clock generating circuits are placed in close proximity to clock input pins of respective ones of the flash ROMs and supply the flash ROMs with read clocks obtained by dividing down the frequency of a system clock. Delay ascribable to wiring is eliminated from the read clocks as a result.

20 Claims, 10 Drawing Sheets

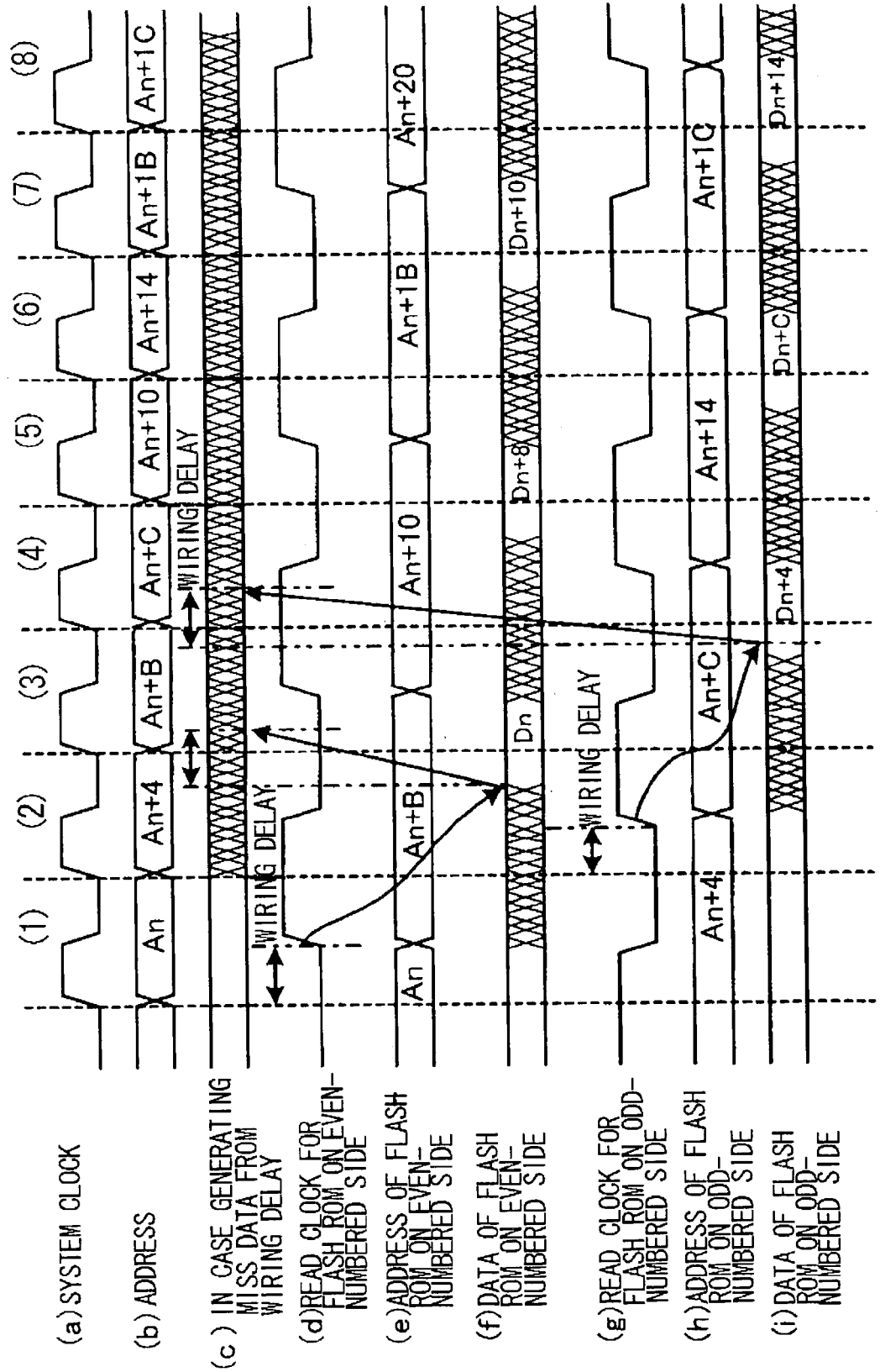

SINGLE-CHIP MICROCOMPUTER WITH READ CLOCK GENERATING CIRCUITS DISPOSED IN CLOSE PROXIMITY TO MEMORY MACROS

FIELD OF THE INVENTION

This invention relates to a method of distributing a read clock in a single-chip microcomputer having memory macros placed on a chip.

BACKGROUND OF THE INVENTION

FIG. 6 illustrates a prior-art example of the layout of a single-chip microcomputer circuit in which a CPU and a plurality of flash ROMs are placed on a chip. Specifically, the circuit has a CPU 1, a plurality of flash ROM macros 2-1 to 2-4 for storing programs, and an interleave controller 3 for exercising control when a fetch bus is interleaved.

The CPU 1 and interleave controller 3 run on an externally applied system clock. The latter is supplied via a clock tree deployed on the chip. Clock skew of the clock supplied to each of the circuit devices by the clock tree is held within a certain limits.

The flash ROMs 2-1 to 2-4 operate at a speed lower than the operating speed of, e.g., the CPU 1. In order to raise the operating speed of a single-chip microcomputer, therefore, the usual practice is to adopt an interleave configuration and operate the plurality of flash ROMs 2-1 to 2-4 alternately, whereby an apparent operating speed equivalent to that of the CPU 1 can be obtained. Clocks obtained by frequency-dividing the system clock in the interleave controller 3 are used as read clocks supplied to the flash ROMs 2-1 to 2-4 at this time.

FIG. 7 is a block diagram illustrating the structure of a conventional single-chip microcomputer circuit in a case where the circuit has two flash ROMs 2-1 and 2-2, the former on an odd-numbered side and the latter on an even-numbered side.

The CPU 1 is connected to the flash ROMs 2-1 and 2-2 via the interleave controller 3. In the connection between the CPU 1 and the interleave controller 3, the CPU 1 outputs addresses for fetching programs that have been stored in the flash ROMs 2-1 and 2-2 and for accessing data, a control signal for controlling the status of the fetch bus and a control signal for controlling clock status and generating a clock. These addresses and signals are output to the interleave controller 3. At the time of consecutive access, data that has been read out of the flash ROM 2-1 on the odd-numbered side and the flash OM 2-2 on the even-numbered side is output as a data signal from the interleave controller 3 to the CPU 1 while the interleave controller 3 switches between these items of data alternately.

In the connections between the interleave controller 3 and the flash ROMs 2-1 and 2-2, addresses that have been reconstructed within the interleave controller 3 in accordance with the flash ROM 2-1 on the odd-numbered side and the flash ROM 2-2 on the even-numbered side based upon the address data from the CPU 1 are output to the flash ROM 2-1 on the odd-numbered side and the flash ROM 2-2 on the even-numbered side, respectively. Further, the interleave controller 3 generates and supplies the read clocks for both the flash ROM 2-1 on the odd-numbered side and the flash ROM 2-2 on the even-numbered side. Data that has been read out of the flash ROMs 2-1 and 2-2 in sync with the read clocks from the interleave controller 3 are output from the flash ROMs 2-1 and 2-2 to the interleave controller 3.

FIG. 8 is a block diagram illustrating the structure of a conventional single-chip microcomputer circuit in a case where two sets of flash ROMs are adopted to conform to the layout of FIG. 6. This arrangement is similar to that of FIG. 7 except for the fact that two sets of flash ROMs (2-1 to 2-4) are disposed on the chip.

In these conventional circuit arrangements, the interleave controller 3 runs on a system clock whose frequency is the same as that of the CPU 1 using the control signal from the CPU 1. It is required, therefore, that set-up time and hold time of the signals be satisfied between the CPU 1 and interleave controller 3. As an operating frequency rises, however, the margin for set-up time diminishes. In a case where operating frequency is raised, therefore, the interleave controller 3 is placed close to the CPU 1. The interleave controller 3 provides address signals, which are reconstructed using the control signal from the CPU 1, generates the read clocks and supplies the address signals and read clocks to the flash ROMs 2-1 to 2-4.

Since the flash ROMs 2-1 to 2-4 occupy a large area, there is a limitation with regard to their positioning on the chip. In addition, the clock-input pins of each of the flash ROMs 2-1 to 2-4 are limited to a single location. After the placement of the flash ROMs 2-1 to 2-4 on the chip is decided, therefore, wiring is performed in such a manner that the read clocks from the interleave controller 3 to the flash ROMs 2-1 to 2-4 will be supplied directly to the flash ROMs over the shortest path. Thus it is so arranged that read-clock skew of each of the flash ROMs 2-1 to 2-4 will be held within fixed limits.

Other signals to be connected are also wired so as to avoid roundabout paths, thereby evening out skew.

FIG. 9 is a time chart illustrating the status of a conventional single-chip microcomputer at the time of a continuous fetch operation. The operation of this prior-art example will be described with reference to FIGS. 6 to 9.

A clock tree extends through a single-chip microcomputer and serves to hold skew between the clocks of a system clock (a) to within fixed limits.

Using the system clock (a), the interleave controller 3 generates both a read clock (d) for flash ROMs 2-2, 2-4 on the even side and a read clock (g) for flash ROMs 2-1, 2-3 on the odd side. These clocks are supplied to the flash ROMs over the shortest distances. Though wiring is implemented over the shortest distances, wiring of a certain length is nevertheless required from the interleave controller 3 to the flash ROMs 2-1 to 2-4. As a consequence, by the time the read clocks from the interleave controller 3 arrive at the clock input pins of the flash ROMs 2-1 to 2-4, they sustain a delay (referred to as "wiring delay") ascribable to wiring length, as illustrated in FIG. 9.

Further, though read-out of data from the flash ROMs 2-1 to 2-4 starts in sync with the rising edges of the read clocks input to the flash ROMs 2-1 to 2-4, there is a large output delay with regard to the flash ROMs 2-1 to 2-4, as depicted in FIG. 9. Consequently, the moment at which read-out data Dn of address An designated by clock cycle (1) is finalized slides to clock cycle (2), as a result of which a further delay (wiring delay) ascribable to wiring length is inflicted upon signals from the output ends of the flash ROMs 2-1 to 2-4 to the CPU 1.

Accordingly, on the side of CPU 1, operation is so adapted that data at the address designated in clock cycle (I) is sampled at the rising edge of clock cycle (3) and data at the address designated in clock cycle (2) is sampled at the rising edge of clock cycle (4), as shown in FIG. 9. If the cycle of the system clock shortens, however, it becomes difficult to assure set-up time at the sampling points of the CPU 1 on these occasions as well.

SUMMARY OF THE DISCLOSURE

Thus, with the prior art described above, the read clocks for the flash ROM macros are generated by the interleave controller 3 and are supplied to the flash ROM macros by the routing of wiring traces. Therefore, in addition to output delay at the flash ROMs 2-1 to 2-4, wiring delay caused by the wiring also occurs. This delay due to wiring is the sum of delay of the read clock that triggers the output of the data and delay until the data arrives at the CPU 1 after being output. Such delay has a major influence upon the limit of the fetch operating frequency of the CPU 1.

For example, if the fetch operating frequency of the CPU 1 rises, a situation occurs in which the data at the address designated in the clock cycle (1) can no longer be sampled at the rising edge of the clock cycle (3) because the data will not yet have arrived at the CPU 1. With a high system clock frequency of this kind, data read-out from the flash ROMs 2-1 to 2-4 is not possible. The upper limit on the system clock that enables the CPU 1 to sample data is thus limited by the delay factors mentioned above.

A method considered to deal with one of these delay factors, namely output delay of the flash ROMs 2-1 to 2-4, is to increase the number of flash ROMs from which parallel read-out is possible. However, since wiring delay of the data up to its arrival at the CPU 1 following output of the data from the flash ROMs cannot be avoided, a technique that will not cause a delay in the output of the data is required.

Accordingly, an object of the present invention is to provide means for eliminating wiring delay to the maximum extent, thereby preventing the operating frequency of a single-chip microcomputer from declining in dependence upon the layout on the chip.

According to the present invention, the foregoing object is attained by providing a single-chip microcomputer in which a plurality of memory macros in an interleaved arrangement are placed on a chip, the microcomputer having a dedicated read clock generating circuit, to which a system clock is input directly, disposed in close proximity to each of the plurality of memory macros, wherein read clocks generated by the dedicated read clock generating circuit are supplied to respective ones of the plurality of memory macros.

Each read clock generating circuit ideally is placed close to a clock-input pin of the corresponding memory macro. Further, a system clock supplied to a CPU is supplied directly to each read clock signal generating circuit, and read clocks synchronized to the system clock are supplied to respective ones of the memory macros. At this time the operating clock of the memory macros is obtained by frequency dividing the system clock supplied to the CPU.

In accordance with this arrangement, the read clock that results in output of data does not sustain a delay ascribable to wiring. This means that data read-out timing can be advanced commensurately, enabling use of a system clock having a higher frequency. As a result, the operating frequency of the single-chip microcomputer can be raised and a higher processing speed becomes possible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a time chart illustrating the status of a prior-art single-chip microcomputer when a high-speed system clock is used in a consecutive fetch operation.

PREFERRED EMBODIMENTS OF THE INVENTION

A preferred embodiment of the present invention will now be described in detail with reference to the drawings.

Figure 1:
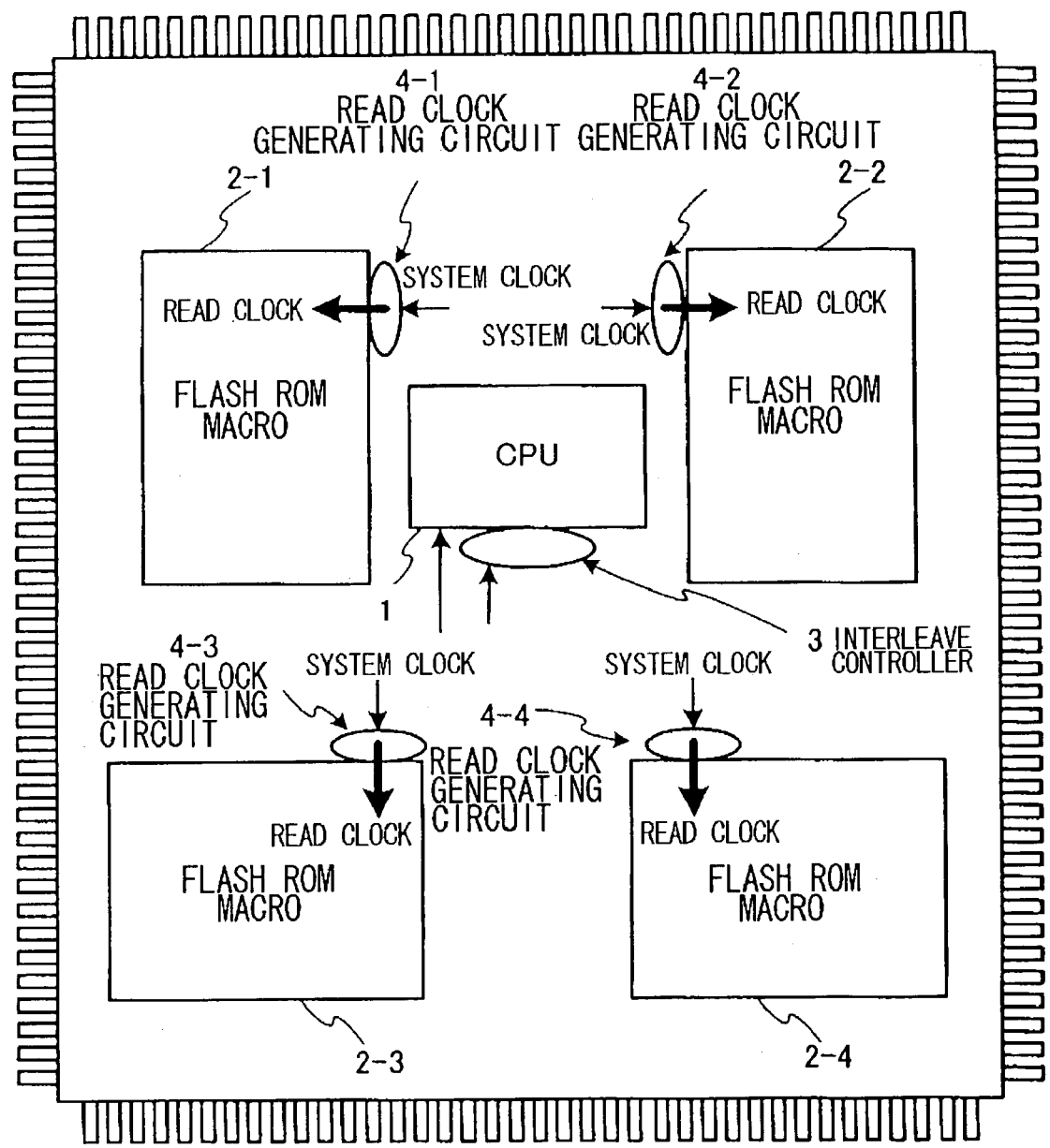
FIG. 1 is a diagram illustrating the circuit layout of a single-chip microcomputer according to an embodiment of the present invention.

FIG. 1 is a diagram illustrating the circuit layout of a single-chip microcomputer according to a preferred embodiment of the present invention.

As shown in FIG. 1, this single-chip microcomputer is similar to that of the prior art in that the microcomputer has the CPU 1, the plurality of flash ROM macros 2-1 to 2-4 for storing programs, and an interleave controller 3 for exercising control when a fetch bus is interleaved. According to the present invention, however, read clock generating circuits 4-1 to 4-4 for supplying respective ones of the flash ROM macros 2-1 to 2-4 with read clocks obtained by frequency-dividing the system clock are provided in close proximity to the clock input pins of the flash ROMs 2-1 to 2-4, respectively.

As mentioned above, the interleave controller 3 runs on a system clock whose frequency is the same as that of the CPU 1 using the control signal from the CPU 1. It is required, therefore, that set-up time and hold time of the signals be satisfied between the CPU 1 and interleave controller 3. As an operating frequency rises, however, the margin for set-up time diminishes. In a case where operating frequency is raised, therefore, the interleave controller 3 is placed close to the CPU 1.

Further, since the flash ROMs 2-1 to 2-4 occupy a large area, there is a limitation with regard to their positioning on the chip. In addition, the clock-input pins of each of the flash ROMs 2-1 to 2-4 are limited to a single location. According to the present invention, therefore, the read clock generating circuits 4-1 to 4-4, which frequency-divide the system clock, are placed very close to these clock input pins after the layout of the flash ROMs 2-1 to 2-4 is decided.

As in the example of the prior art, wiring is performed is such a manner that the signals to be connected will not follow meandering paths.

The CPU 1, interleave controller 3 and read clock generating circuits 4-1 to 4-4 are operated by the externally applied system clock. The latter operates through a clock tree extending through chip, and clock skew of the clock pulses is made to fall within fixed limits by the clock tree.

The flash ROMs 2-1 to 2-4 operate at a speed lower than the operating speed of the CPU 1, etc. In order to raise the operating speed of a single-chip microcomputer, therefore, an interleave configuration is adopted and the plurality of flash ROMs 2-1 to 2-4 are operated alternately, whereby an apparent operating speed equivalent to that of the CPU 1 can be obtained. Clocks obtained by frequency-dividing the system clock by the read clock generating circuits 4-1 to 4-4 are used as the clocks supplied to the flash ROMs 2-1 to 2-4 at this time.

Figure 2:
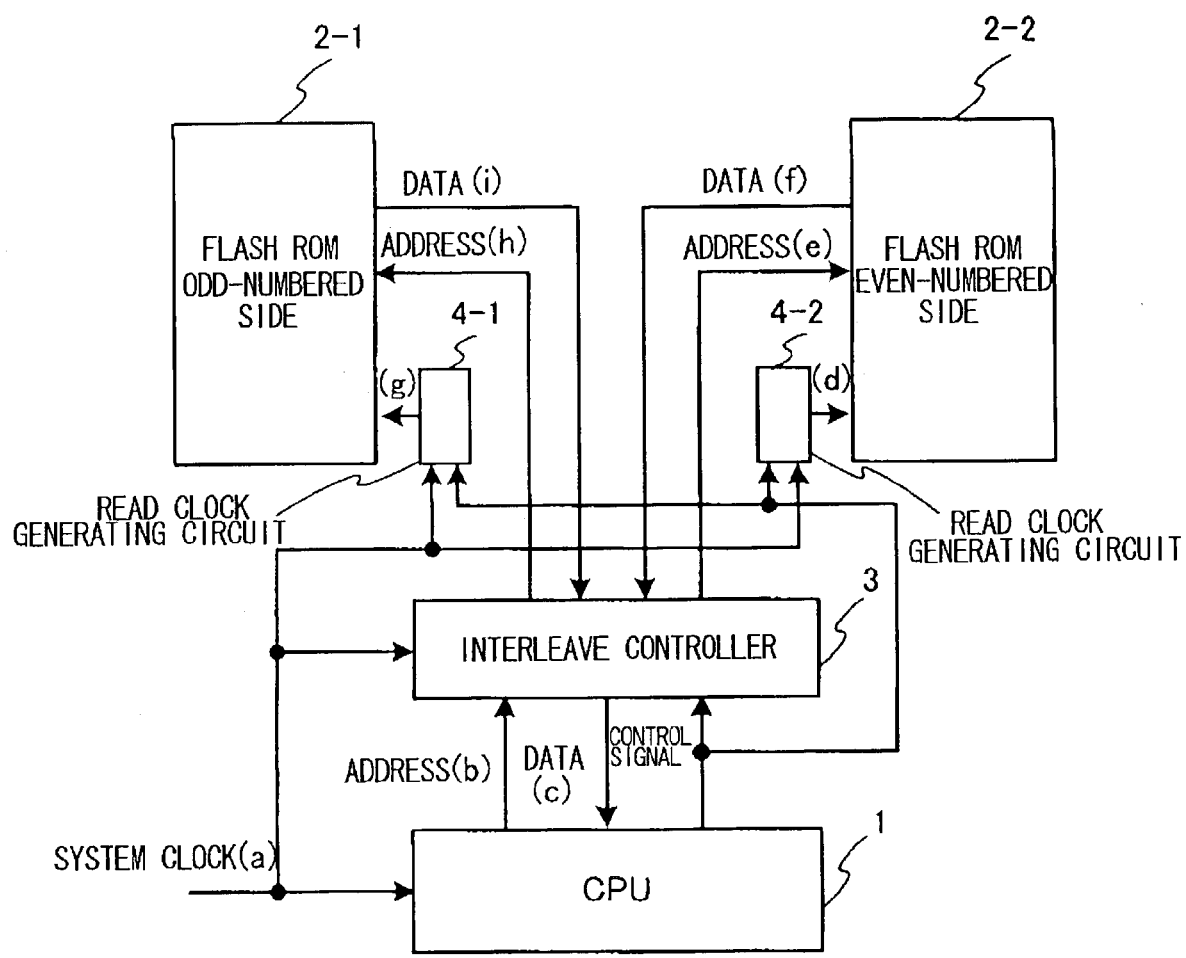
FIG. 2 is a block diagram illustrating an example of the circuit structure of a single-chip microcomputer according to the embodiment.

FIG. 2 is a block diagram illustrating the structure of the single-chip microcomputer circuit of this embodiment in a case where the circuit has two flash ROMs 2-1 and 2-2, the former on an odd-numbered side and the latter on an even-numbered side. Provided within the single-chip microcomputer are the flash ROMs 2-1 and 2-2 for storing programs, the CPU 1, the interleave controller 3 for performing control when the fetch bus has an interleave configuration, and the read clock generating circuits 4-1 and 4-2 for generating the read clocks of the flash memories 2-1 and 2-2, respectively.

In the arrangement of FIG. 2, the CPU 1 outputs addresses for fetching programs that have been stored in the flash ROMs 2-1 and 2-2 and for accessing data, and a control signal for controlling the status of the fetch bus. These addresses and signal are output to the interleave controller 3. Data that has been read out of the flash ROM 2-1 on the odd-numbered side and the flash ROM 2-1 on the even-numbered side is output as a data signal from the interleave controller 3 to the CPU 1 while the interleave controller 3 switches between these items of data alternately.

The interleave controller 3 internally reconstructs addresses corresponding to the flash ROM 2-1 on the odd-numbered side and the flash ROM 2-1 on the even-numbered side and outputs these as addresses for accessing the flash ROM 2-1 on the odd-numbered side and the flash ROM 2-1 on the even-numbered side. Data that has been read out of the flash ROMs 2-1 and 2-2 in sync with the read clocks from the read clock generating circuits 4-1 and 4-2, respectively, are output from the flash ROMs 2-1 and 2-2 to the interleave controller 3.

The read clock generating circuits 4-1 and 4-2 supply the flash ROMs 2-1 and 2-2, respectively, with the read clocks, which are obtained by frequency-dividing the system clock. The CPU 1 controls the status of the clocks in the read clock generating circuits 4-1 and 4-2 and outputs a control signal for generating the read clocks.

Figure 3:
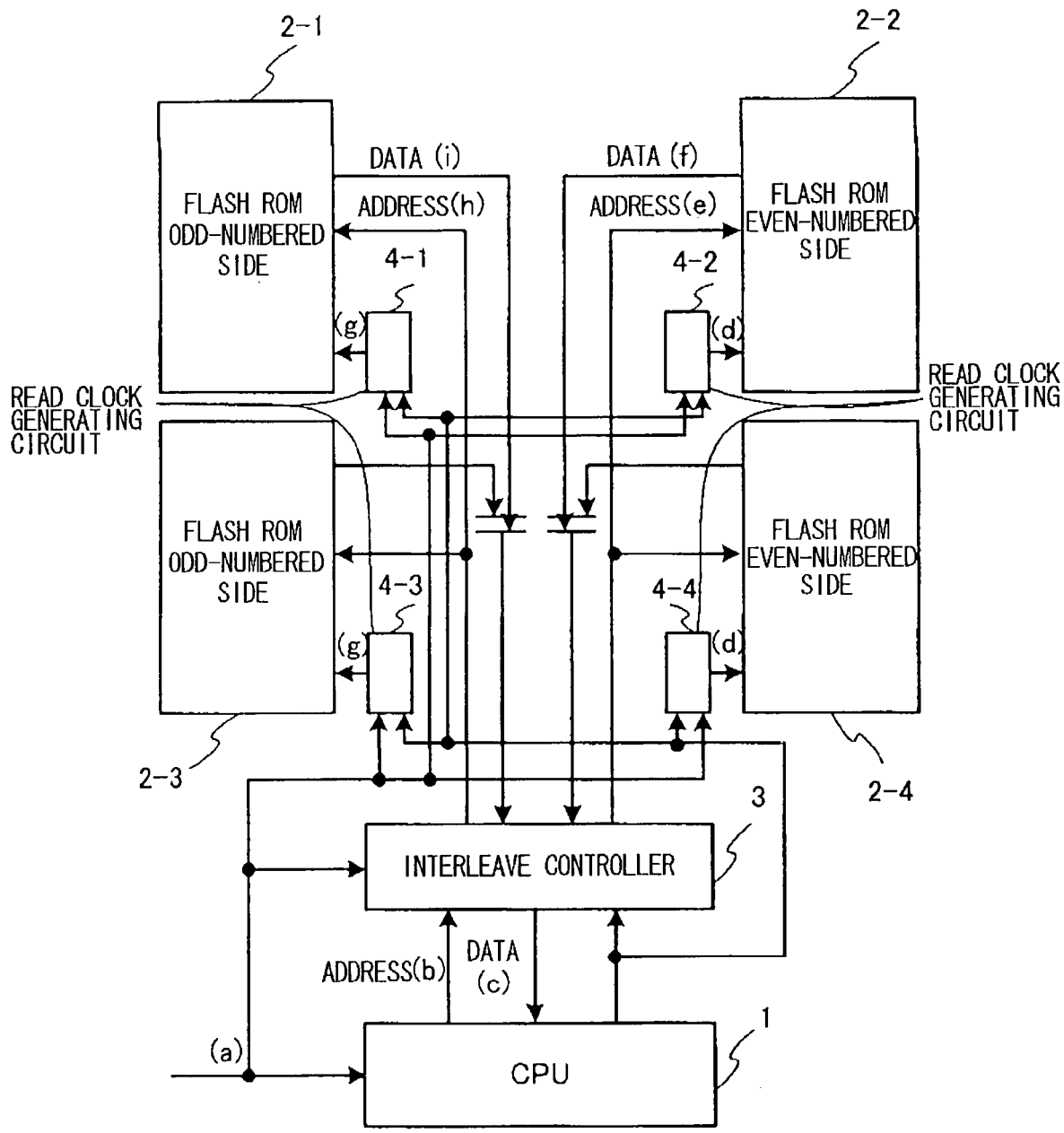
FIG. 3 is a block diagram illustrating another example of the circuit structure of a single-chip microcomputer according to the embodiment.

FIG. 3 is a block diagram illustrating the structure of a conventional single-chip microcomputer circuit according to this embodiment in a case where two sets of flash ROMs are adopted to conform to the circuit layout of FIG. 1. This arrangement is similar to that of FIG. 2 except for the fact that two sets of flash ROMs (2-1 to 2-4) are disposed on the chip.

Figure 4:
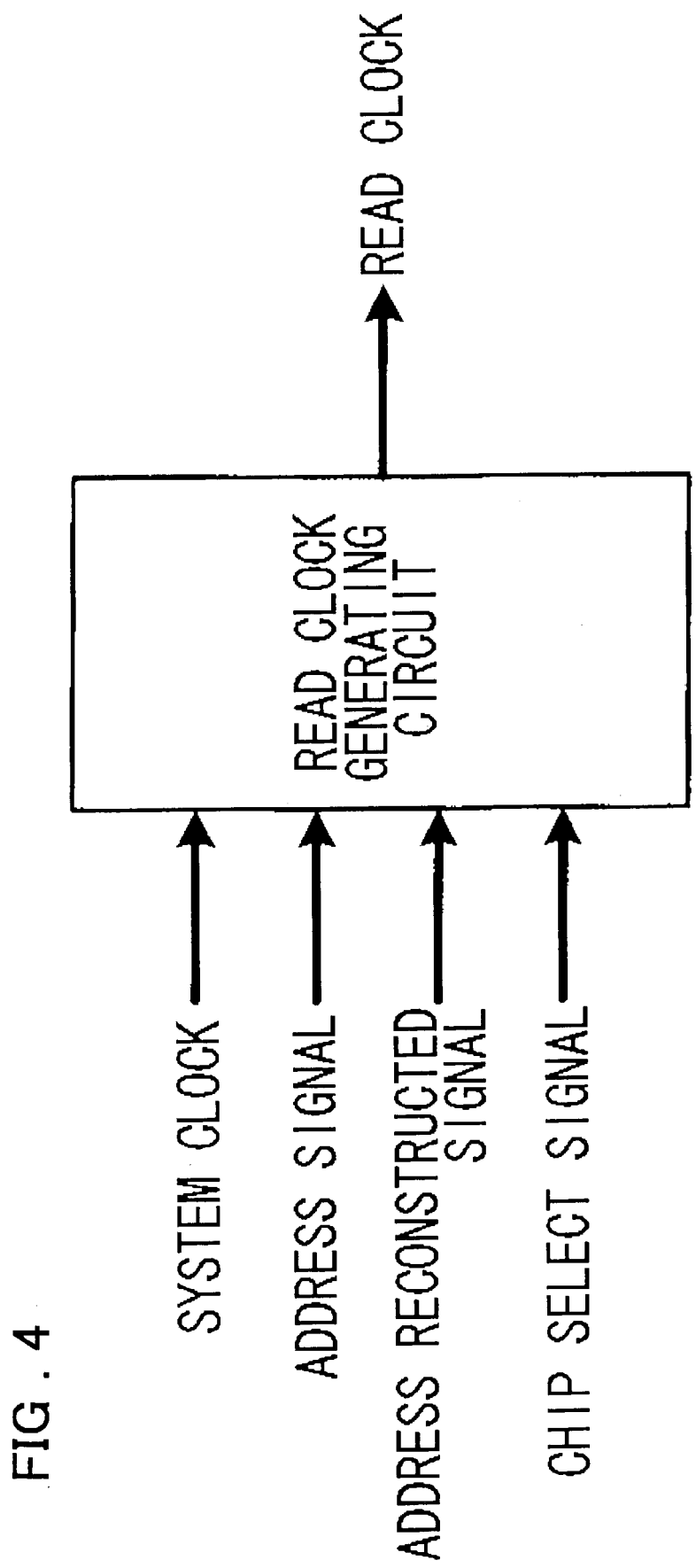
FIG. 4 is a schematic view illustrating the relationship between the inputs and output of a read clock generating circuit used in this embodiment.

FIG. 4 is a schematic view illustrating the relationship between the inputs and output of the read clock generating circuits 4-1 and 4-2 used in this embodiment. The read clock generating circuits 4-1 and 4-2 divide the frequency of the system clock and change the clock cycle as necessary.

The system clock, an address signal for identifying odd and even addresses, a flash-ROM chip select signal and a signal for discriminating the reconstructed state of an address as by a jump instruction are input to each of the read clock generating circuits 4-1 and 4-2. If the flash ROM data is 4-byte data, then the address signal for identifying odd and even addresses may employ an address signal that is the third bit from the least significant.

The address signal for identifying odd and even addresses, the flash-ROM chip select signal and the signal for discriminating the reconstructed state of an address as by a jump instruction are input as control signals from the CPU 1. At the time of consecutive access, a clock having a cycle obtained by frequency dividing the system clock is output as the read clock. However, in a case where fetch is halted or a jump is made to access a non-consecutive address, the cycle of the read clock is lengthened.

Figure 5:
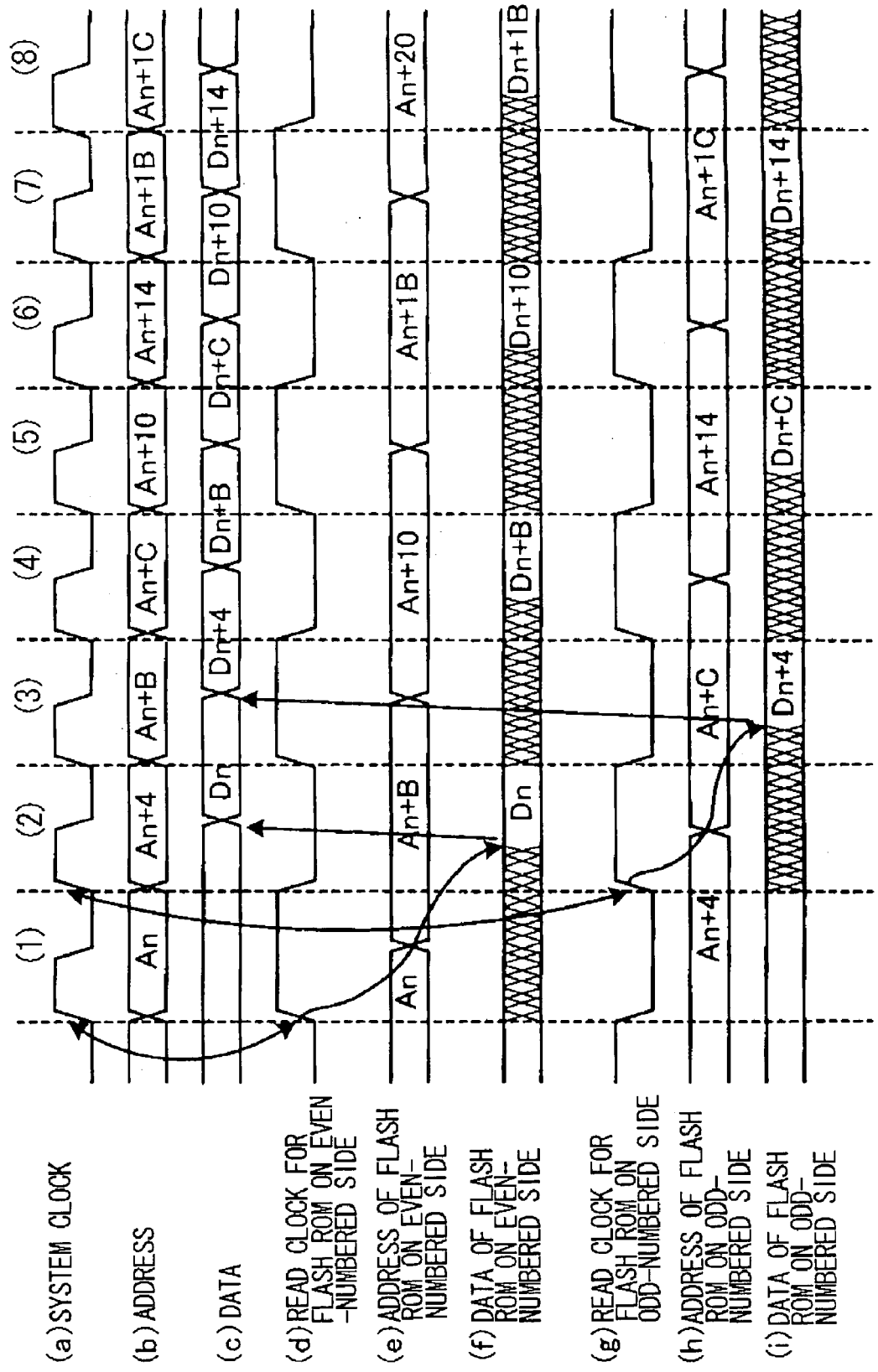
FIG. 5 is a time chart illustrating the status of the conventional single-chip microcomputer at the time of a consecutive fetch operation in this embodiment.
Figure 6:
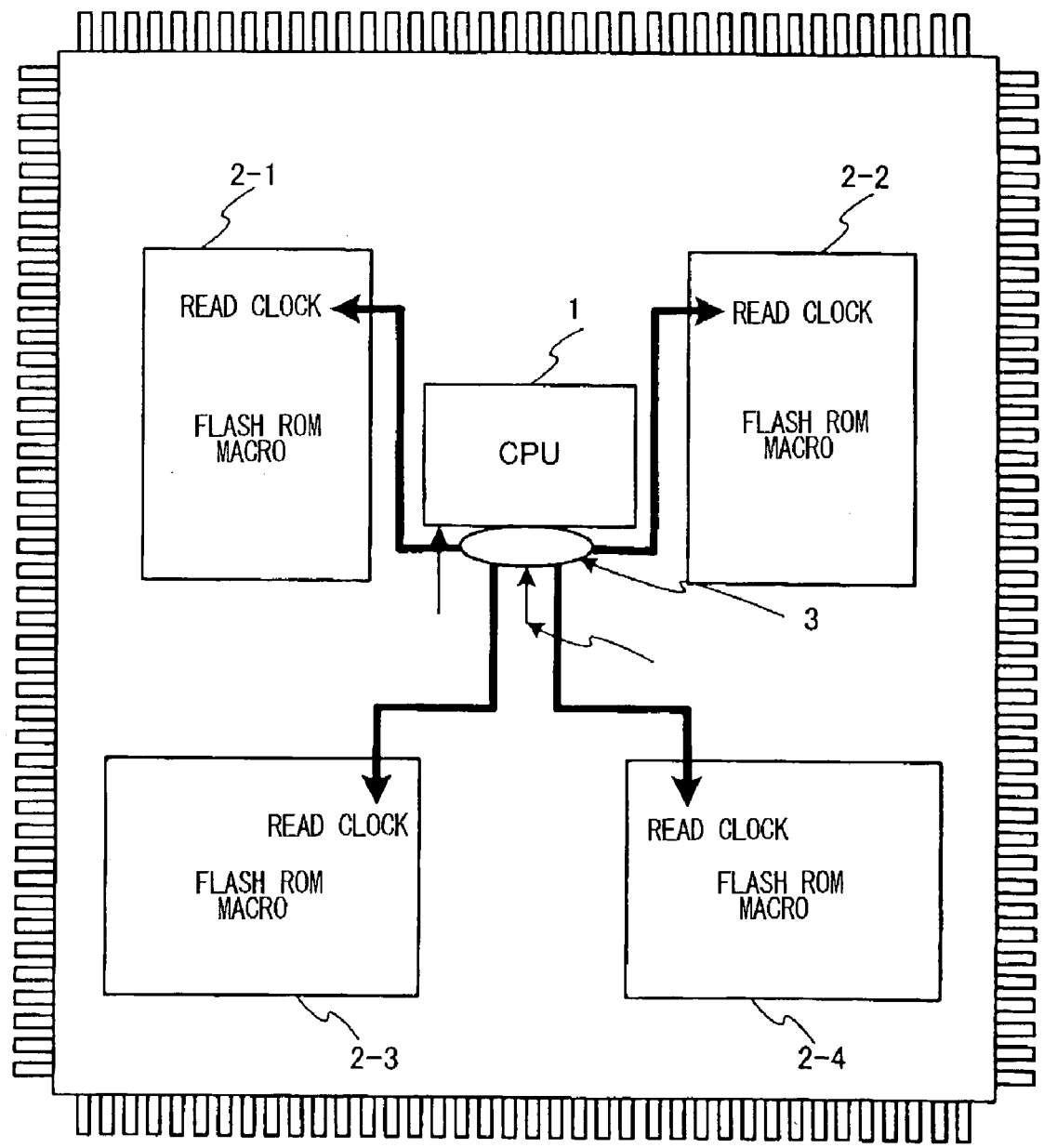
FIG. 6 is a diagram illustrating the circuit layout of a single-chip microcomputer according to the prior art.
Figure 7:
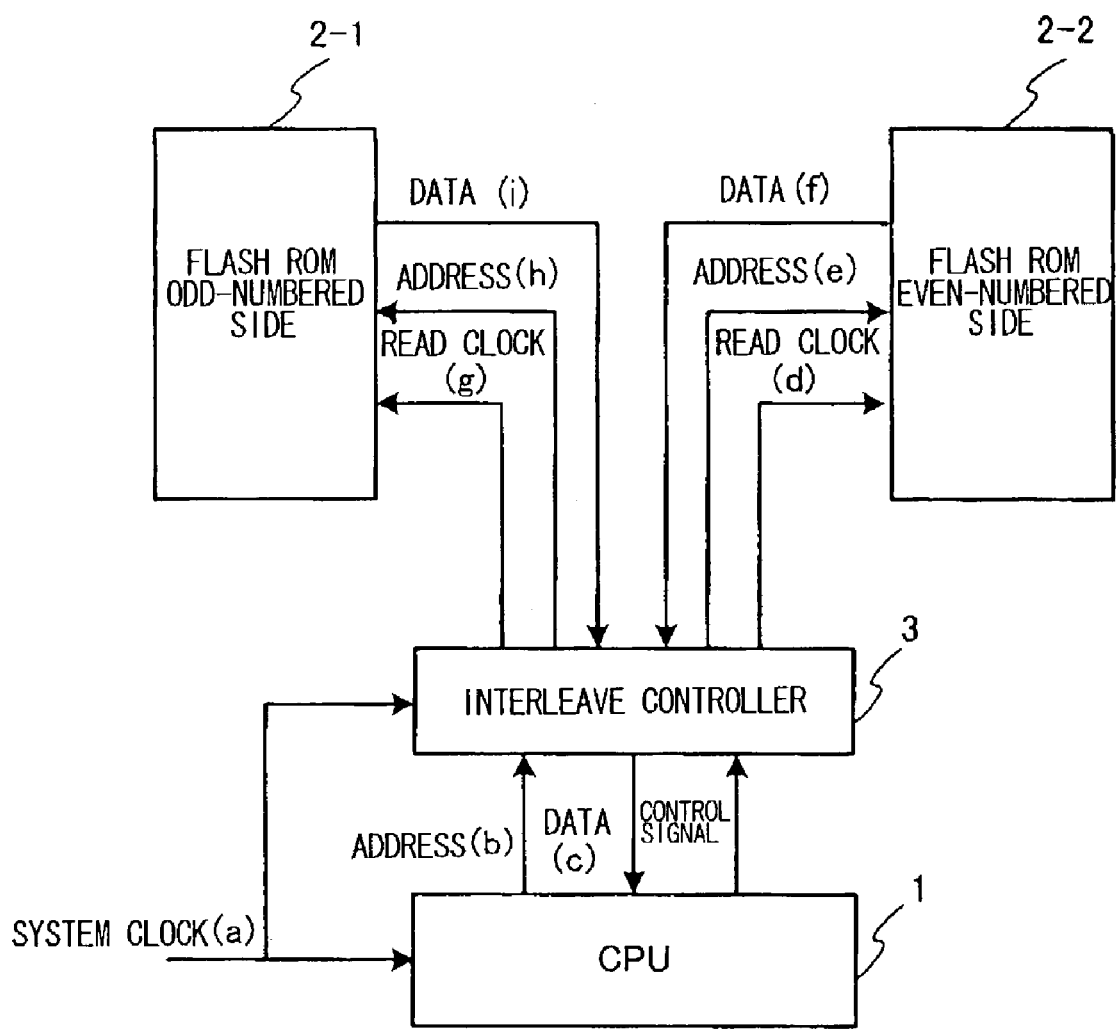
FIG. 7 is a block diagram illustrating an example of the structure of a single-chip microcomputer circuit according to the prior art.
Figure 8:
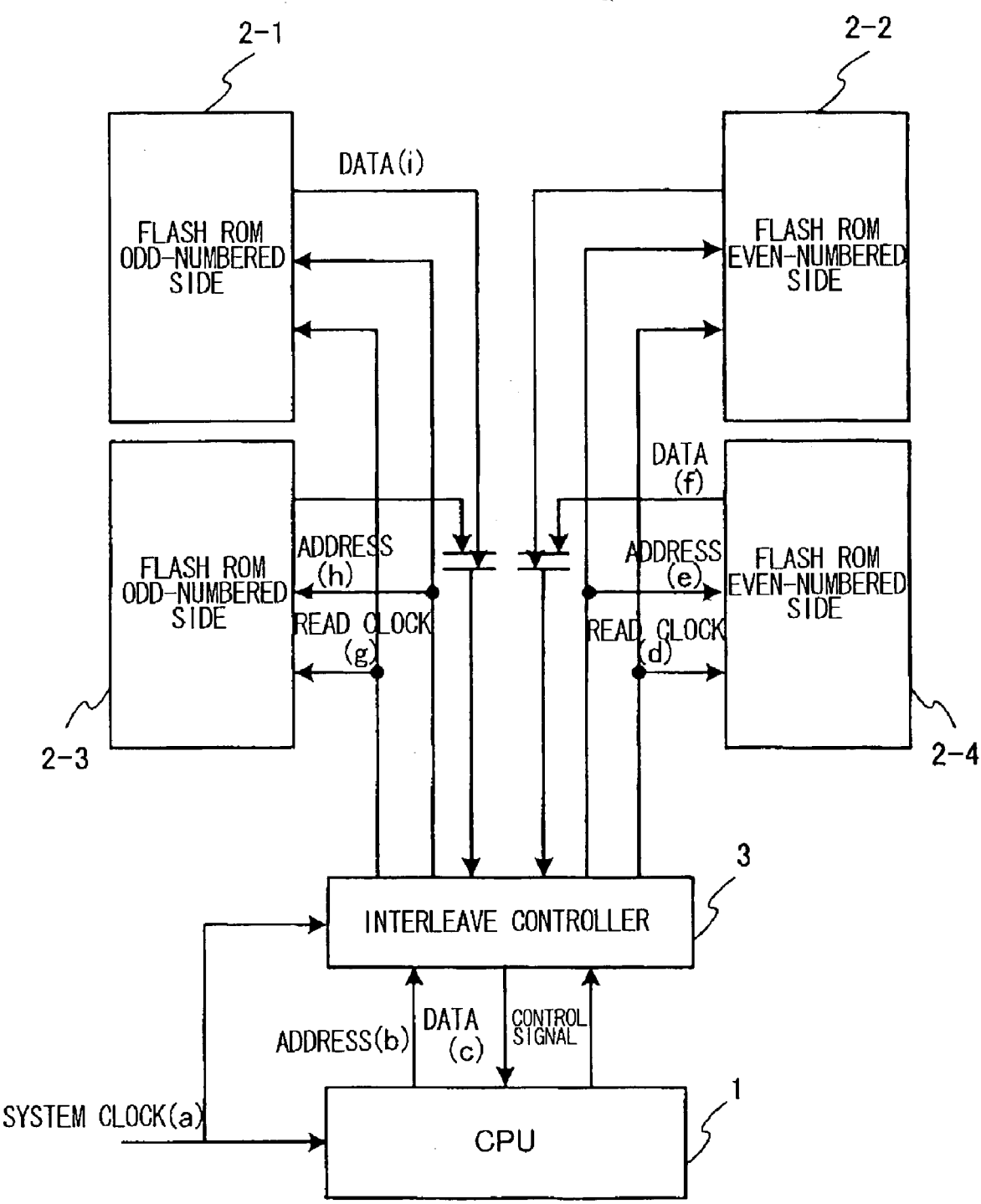
FIG. 8 is a block diagram illustrating another example of the structure of a single-chip microcomputer circuit according to the prior art.
Figure 9:
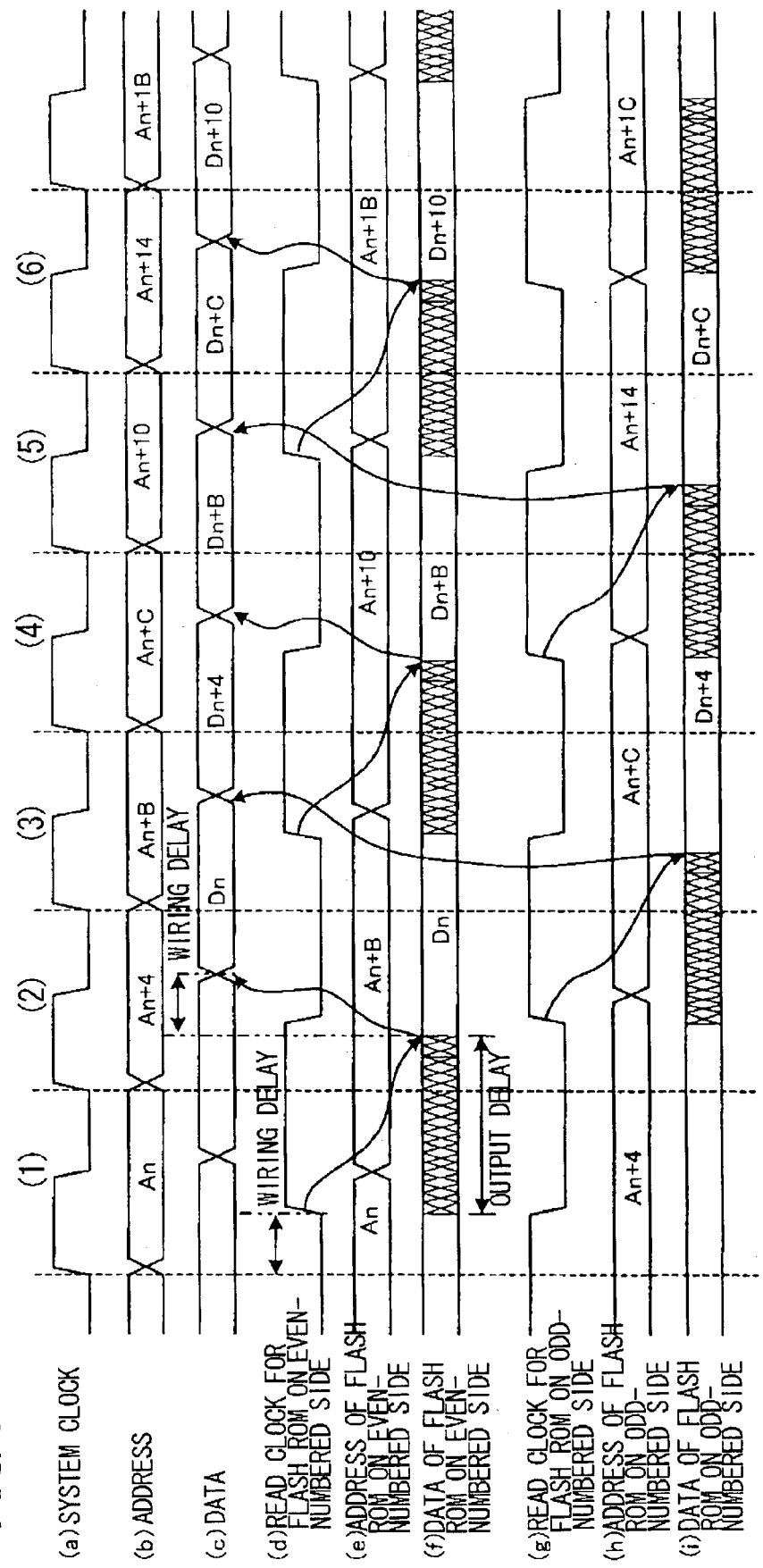
FIG. 9 is a time chart illustrating the status of a prior-art single-chip microcomputer at the time of a consecutive fetch operation.

FIG. 5 is a time chart illustrating the status of the single-chip microcomputer of this embodiment at the time of a consecutive fetch operation. Operation of this embodiment will be described with reference to FIGS. 2 and 5.

The clock tree is wired through the single-chip microcomputer and serves to hold skew between the clocks of a system clock (a) to within fixed limits.

Using the system clock (a), the read clock generating circuits 4-1 and 4-2 supply the flash ROM macros with a read clock (d) for the flash ROMs on the even side and a read clock (g) for the flash ROMs on the odd side while holding delay of both read clocks to the minimum.

Data (f) on the even-numbered side of the flash ROMs is output in sync with the rising edge of the read clock (d), which rises in sync with the rising edge of the clock cycle (1). However, since output delay of the flash ROMs is large, the data is not finalized by the time of the clock cycle (2), as illustrated in FIG. 5.

Consequently, if even a small delay is incurred when a read clock is supplied to a flash ROM, transmission of data to the fetch-data input terminal of the CPU 1 will be delayed. On the side of the CPU 1, data that has been read out from the address accessed in the clock cycle (1) is sampled at the rising edge of the clock cycle (3). Accordingly, the data must reach the CPU 1 after set-up time is secured with respect to the rising edge of the clock cycle (3) at which the data is sampled.

In this embodiment, skew of the system clock is assured by the clock tree. Further, by placing the read clock generating circuits 4-1 and 4-2 very close to the clock input pins of the flash ROMs 2-1 to 2-4, respectively, delay ascribable to wiring is eliminated from the read clocks of the flash ROMs to the maximum extent possible. As a result, even if the operating frequency of the single-chip microcomputer is made higher than that of the prior art, it is possible to achieve early arrival of data by an amount equivalent to set-up time from the data sampling point of the CPU 1. This means that processing speed can be raised.

According to the above embodiment, two flash ROMs are provided. However, the present invention is applicable also in a case where there are four flash ROMs, as shown in FIG. 3, or in a case where the number of flash ROMs is 2×n. Further, the invention is applicable also to other memory (ROM or RAM, etc.) macro configurations in which interleaving is adopted and a memory is accessed using a frequency-divided clock.

The meritorious effects of the present invention are summarized as follows.

Thus, according to the present invention, dedicated read clock generating circuits for respective ones of flash ROMs are disposed in close proximity to the clock input terminals of the flash ROMs in a single-chip microcomputer having a plurality of flash ROM macros. This makes it possible to minimize delay of the read clocks ascribable to wiring and to prevent the operating frequency of the single-chip microcomputer from declining in dependence upon the macro layout.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A microcomputer in which a CPU, a plurality of memory macros, and an interleave controller are positioned on a chip, said interleave controller allowing for interleaving in which the plurality of memory macros are operated alternately based on whether memory addresses output by the CPU for memory accesses are odd or even, said microcomputer comprising:
   a plurality of dedicated read clock generating circuits;
   wherein each dedicated read clock generating circuit of the plurality of dedicated read clock generating circuits is separate and apart from said interleave controller;
   wherein each dedicated read clock generating circuit of the plurality of dedicated read clock generating circuits is configured to generate a respective read clock signal by receiving and frequency-dividing a system clock signal;
   wherein each dedicated read clock generating circuit of the plurality of dedicated read clock generating circuits is connected to receive the system clock signal from a corresponding clock signal path that does not come from said interleave controller;
   wherein each dedicated read clock generating circuit of the plurality of dedicated read clock generating circuits is configured to supply the respective read clock signal over a corresponding wire to a corresponding memory macro of the plurality of memory macros; and
   wherein each dedicated read clock generating circuit of the plurality of dedicated read clock generating circuits is disposed on the chip in close proximity to the corresponding memory macro of the plurality of memory macros.

2. The microcomputer according to claim 1, wherein each dedicated read clock generating circuit of said plurality of dedicated read clock generating circuits is disposed physically closer to a corresponding clock input pin of the corresponding memory macro of said plurality of memory macros than to the interleave controller.

3. The microcomputer according to claim 1, wherein the system clock signal is supplied to each of the plurality of dedicated read clock generating circuits and to the interleave controller and to the CPU by a clock tree extending over the chip.

4. The microcomputer according to claim 1, wherein each of said plurality of dedicated read clock generating circuits has input signals including said system clock signal, an address signal for identifying odd and even addresses, a memory-macro chip select signal, and a reconstructed state signal for discriminating a reconstructed state of an address; and
   wherein said plurality of dedicated read clock generating circuits are configured to generate said respective read clocks by frequency-dividing the system clock signal based on said address signal, said memory-macro chip select signal, and said reconstructed state signal.

5. The microcomputer according to claim 1,
   wherein said interleave controller is disposed physically closer to said CPU than to each of the plurality of dedicated read clock generating circuits;
   wherein said interleave controller is configured to reconstruct addresses corresponding to the plurality of memory macros based upon address data from said CPU and is configured to output the addresses as addresses for accessing respective ones of the plurality of memory macros; and
   wherein said interleave controller is configured to output data, which has been read out of the plurality of memory macros, to said CPU as data signals.

6. The microcomputer according to claim 1, wherein the plurality of memory macros are flash ROMs.

7. The microcomputer according to claim 1, wherein each of the plurality of memory macros is one of a ROM and a RAM.

8. The microcomputer according to claim 2, wherein the system clock signal is supplied to each of the plurality of dedicated read clock generating circuits and to the interleave controller and to the CPU by a clock tree extending over the chip.

9. The microcomputer according to claim 2, wherein each of said plurality of dedicated read clock generating circuits has input signals including said system clock signal, an address signal for identifying odd and even addresses, a memory-macro chip select signal, and a reconstructed state signal for discriminating a reconstructed state of an address; and
   wherein said plurality of dedicated read clock generating circuits are configured to generate said respective read clocks by frequency-dividing the system clock signal based on said address signal, said memory-macro chip select signal, and said reconstructed state signal.

10. The microcomputer according to claim 3, wherein each of said plurality of dedicated read clock generating circuits has input signals including said system clock signal, an address signal for identifying odd and even addresses, a memory-macro chip select signal, and a reconstructed state signal for discriminating a reconstructed state of an address; and
    wherein said plurality of dedicated read clock generating circuits are configured to generate said respective read clocks by frequency-dividing the system clock signal based on said address signal, said memory-macro chip select signal, and said reconstructed state signal.

11. The microcomputer according to claim 2,
    wherein said interleave controller is disposed physically closer to said CPU than to each of the plurality of dedicated read clock generating circuits;
    wherein said interleave controller is configured to reconstruct addresses corresponding to the plurality of memory macros based upon address data from said CPU and is configured to output the addresses as addresses for accessing respective ones of the plurality of memory macros; and wherein said interleave controller is configured to output data, which has been read out of the plurality of memory macros, to said CPU as data signals.

12. The microcomputer according to claim 3,
wherein said interleave controller is disposed physically closer to said CPU than to each of the plurality of dedicated read clock generating circuits;
wherein said interleave controller is configured to reconstruct addresses corresponding to the plurality of memory macros based upon address data from said CPU and is configured to output the addresses as addresses for accessing respective ones of the plurality of memory macros; and
wherein said interleave controller is configured to output data, which has been read out of the plurality of memory macros, to said CPU as data signals.

13. The microcomputer according to claim 4,
wherein said interleave controller is disposed physically closer to said CPU than to each of the plurality of dedicated read clock generating circuits;
wherein said interleave controller is configured to reconstruct addresses corresponding to the plurality of memory macros based upon address data from said CPU and is configured to output the addresses as addresses for accessing respective ones of the plurality of memory macros; and
wherein said interleave controller is configured to output data, which has been read out of the plurality of memory macros, to said CPU as data signals.

14. The microcomputer according to claim 1,
wherein each dedicated read clock generating circuit of said plurality of dedicated read clock generating circuits is disposed in close proximity to the corresponding memory macro of said plurality of memory macros such that a wiring delay of the respective read clock signal ascribable to a length of the corresponding wire is substantially eliminated.

15. A microcomputer, comprising:
a CPU positioned on a chip and connected to receive a system clock signal supplied by a clock tree;
a plurality of memory macros positioned on the chip;
an interleave controller positioned on the chip and coupled between said CPU and said plurality of memory macros, said interleave controller connected to receive said system clock signal from said clock tree; and
a plurality of read clock generating circuits;
wherein each read clock generating circuit of said plurality of read clock generating circuits is separate and apart from said interleave controller;
wherein each read clock generating circuit of said plurality of read clock generating circuits is connected to receive said system clock signal from said clock tree over a corresponding clock signal path that does not come from said interleave controller;
wherein each read clock generating circuit of said plurality of read clock generating circuits is configured to generate a respective read clock signal by frequency-dividing said system clock signal;
wherein each read clock generating circuit of said plurality of read clock generating circuits is connected to supply the respective read clock signal over a corresponding wire to a corresponding memory macro of the plurality of memory macros; and
wherein each read clock generating circuit of said plurality of read clock generating circuits is positioned on said chip physically closer to the corresponding memory macro of said plurality of memory macros than to the interleave controller.

16. The microcomputer according to claim 15,
wherein each of said plurality of read clock generating circuits has input signals including said system clock signal, an address signal for identifying odd and even addresses, a memory-macro chip select signal, and a reconstructed state signal for discriminating a reconstructed state of an address; and
wherein each of said plurality of read clock generating circuits is configured to generate said respective read clock by frequency-dividing the system clock signal based on said address signal, said memory-macro chip select signal, and said reconstructed state signal.

17. The microcomputer according to claim 15,
wherein said interleave controller is disposed physically closer to said CPU than to each of the plurality of read clock generating circuits;
wherein said interleave controller is configured to reconstruct addresses corresponding to the plurality of memory macros based upon address data from said CPU and is configured to output the addresses as addresses for accessing respective ones of the plurality of memory macros; and
wherein said interleave controller is configured to output data, which has been read out of the plurality of memory macros, to said CPU as data signals.

18. The microcomputer according to claim 15, wherein the plurality of memory macros are flash ROMs.

19. The microcomputer according to claim 15, wherein each read clock generating circuit of said plurality of read clock generating circuits is positioned on said chip in a respective position so as to minimize a wiring delay of the respective read clock signal due to a length of the corresponding wire.

20. The microcomputer according to claim 1, wherein each dedicated read clock generating circuit of said plurality of dedicated read clock generating circuits is disposed on the chip in close proximity to the corresponding memory macro of the plurality of memory macros so as to minimize a wiring delay of the respective read clock signal due to a length of the corresponding wire.

* * * * *